US007721700B2

(12) United States Patent
Ishida et al.

(10) Patent No.: US 7,721,700 B2
(45) Date of Patent: May 25, 2010

(54) ENGINE UNIT AND STRADDLE-TYPE VEHICLE PROVIDED WITH THE SAME

(75) Inventors: Yousuke Ishida, Shizuoka (JP); Akifumi Oishi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 12/019,588

(22) Filed: Jan. 24, 2008

(65) Prior Publication Data

US 2008/0178834 A1 Jul. 31, 2008

(30) Foreign Application Priority Data

Jan. 26, 2007 (JP) ............................ 2007-016492

(51) Int. Cl.
*F01M 1/02* (2006.01)

(52) U.S. Cl. ............................ 123/196 R; 123/195 R; 184/24

(58) Field of Classification Search ............ 123/195 R, 123/196 R, 196 CP; 192/135, 110 R; 184/11.2, 184/24

See application file for complete search history.

(56) References Cited

U.S. PATENT DOCUMENTS

2006/0128510 A1 * 6/2006 Masuda et al. ................ 474/8

FOREIGN PATENT DOCUMENTS

| | | |
|---|---|---|
| JP | 06-065894 | 8/1994 |
| JP | 2001-003723 | 1/2001 |
| WO | WO 03/085278 A1 | 10/2003 |

* cited by examiner

*Primary Examiner*—Noah Kamen
(74) *Attorney, Agent, or Firm*—Keating & Bennett, LLP

(57) ABSTRACT

An engine unit for a motorcycle that efficiently supplies lubricating oil to a clutch mechanism includes a connecting rod connected to a crank shaft, an oil pump, a clutch shaft having a clutch shaft body and a centrifugal type clutch, and a reduction mechanism having a reduction shaft in parallel to the crank shaft. The oil pump supplies lubricating oil to a connection of the crank shaft and the connecting rod. The clutch shaft body is arranged in parallel to the crank shaft. The clutch shaft body is closer to the crank shaft than is the reduction shaft. Lubricating oil supplied to the connection to scatter is led to the clutch shaft.

9 Claims, 6 Drawing Sheets

1
2
3
4
5
6
7
8
9
10
11
12
13

120
116a
117c
140

ENGINE UNIT AND STRADDLE-TYPE VEHICLE PROVIDED WITH THE SAME

RELATED APPLICATIONS

This application claims the benefit of priority under 35 USC 119 of Japanese patent application no. 2007-016492, filed on Jan. 26, 2007, which application is hereby incorporated by reference in its entirety.

BACKGROUND OF THE INVENTION

1. Field of the Invention

The present invention relates to an engine unit for a straddle-type vehicle.

2. Description of Related Art

Generally, an engine for a straddle-type vehicle such as a motorcycle comprises a clutch mechanism that transmits rotation of a crank shaft to an output shaft, or cuts off the rotation. An automatic centrifugal type clutch mechanism has a bowl-shaped outer clutch, of which an axial end is opened, fixed to an output side thereof and an input member arranged in the outer clutch to fix the same to an input side thereof (see, for example, JP-A-2001-3723). There is also known a wet multi-disc type clutch mechanism having a multiplicity of inner and outer clutch plates interposed between an outer clutch fixed to an input side thereof and an inner clutch fixed to an output side thereof (see, for example, JP-B-6-65894).

In such wet type clutch mechanisms lubricating oil must be supplied to inhibit seizure between constituent members of the clutch mechanism, such as between an outer clutch and an input member, between an inner clutch plate and an outer clutch plate, or the like. In one method of supplying lubricating oil, there is no specific construction for ensuring lubrication of the clutch mechanism, and the clutch mechanism itself scatters lubricating oil collected on a bottom of a crank case to provide for lubrication. However, there is a concern that a sufficient quantity of lubricating oil may not surely be supplied to the clutch mechanism only by the clutch mechanism itself scattering the lubricating oil.

A method has also been proposed that uses an exclusive lubricating-oil pump to supply lubricating oil to a clutch mechanism. While this method surely supplies lubricating oil to the clutch mechanism, size and complexity of the clutch mechanism is increased due to the need for an exclusive lubricating-oil pump.

In view of this problem, WO2003/085278 discloses a method by which lubricating oil supplied to a connection of a crank pin and a connecting rod is led to the clutch mechanism.

FIG. 5 is a cross sectional view showing an engine unit 112 described in WO2003/085278. As shown in FIG. 5, an oil supply passage 120*d* is formed in a crank shaft 120. Lubricating oil is supplied to a connection 142 of a crank pin 115, which is mounted to crank arms 120*a*, 120*b*, and a connecting rod 124 via oil supply passage 120*d*. Lubricating oil as supplied scatters rearward upon rotation of crank shaft 120. As shown in FIG. 6, an open hole 117*c* is formed in a clutch chamber and the scattering lubricating oil is introduced into the clutch chamber from open hole 117*c*. Lubricating oil as thus introduced is supplied to a clutch shaft 140 and a clutch mechanism 150.

With the engine unit of WO2003/085278, however, a transmission shaft 116*a* is arranged between crank shaft 120 and clutch shaft 140 and prevents lubricating oil scattered by rotation of crank shaft 120 from being supplied to clutch shaft

140. Accordingly, there is a problem in that it is difficult to efficiently supply lubricating oil to clutch shaft 140 and clutch mechanism 150.

SUMMARY OF THE INVENTION

The invention has been thought of in view of the situation and provides an engine unit in which lubricating oil is efficiently supplied to a clutch mechanism.

An engine unit according to the invention comprises a crank shaft, a connecting rod connected to the crank shaft, a lubricating oil supply mechanism, a clutch shaft, and a transmission mechanism. The clutch shaft includes a wet type clutch mechanism mounted to a clutch shaft body arranged in parallel to the crank shaft. The transmission mechanism includes a transmission shaft arranged in parallel to the crank shaft that meshes with the clutch mechanism.

The clutch shaft body is closer to the crank shaft than is the transmission shaft, and lubricating oil supplied to the connection is led to the clutch shaft.

A straddle-type vehicle according to the invention comprises the engine unit according to the invention.

According to the invention, lubricating oil is efficiently supplied to the clutch mechanism.

Other features and advantages of the invention will be apparent from the following detailed description, taken in conjunction with the accompanying drawings which illustrate, by way of example, various features of embodiments of the invention.

DETAILED DESCRIPTION OF THE INVENTION

According to an embodiment of the invention, from the viewpoint of making an engine unit compact, a transmission (reduction) shaft, which is ordinarily arranged between an axis of rotation of a crank shaft and an axis of rotation of a clutch shaft, is positioned more distant from the crank shaft than from the clutch shaft, whereby lubricating oil scattering from the crank shaft is efficiently fed to the clutch shaft and a clutch mechanism.

Figure 1:
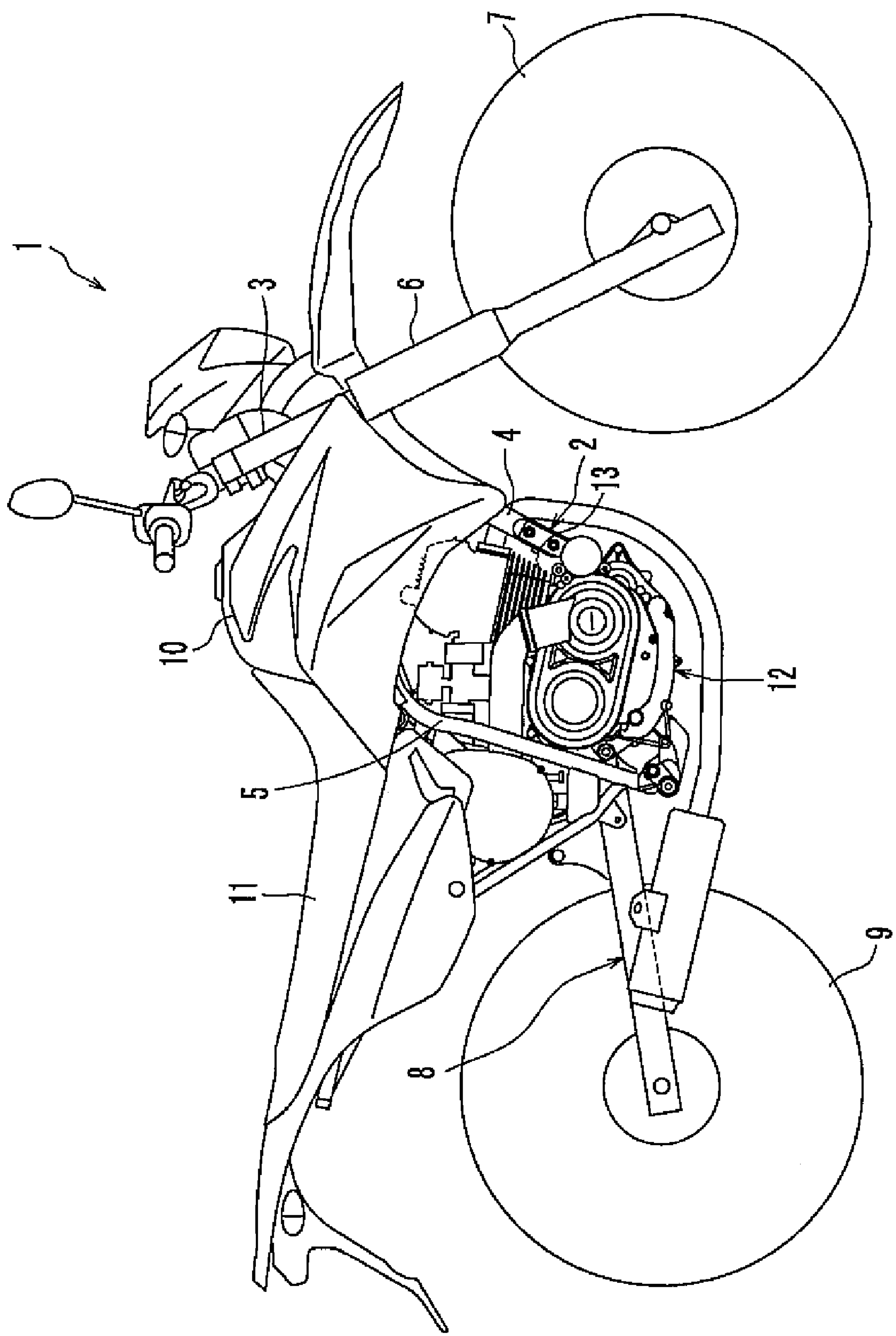
FIG. 1 is a side view of a motorcycle embodying the invention.

An embodiment of the invention is described below with reference to the drawings. An offroad type motorcycle 1, shown in FIG. 1, is described as an example of a straddle-type vehicle in which the invention is embodied. However, the invention is not so limited and may be embodied in motorcycles of other types such as a motorcycle type, scooter type, a moped type, or the like, or in a straddle-type vehicle other than a motorcycle such as an all terrain vehicle (ATV).

—Outline Construction of Motorcycle 1—

An outline construction of motorcycle 1 is described primarily with reference to FIG. 1. Front, rear, left and right directions in the following descriptions are from the perspective of a rider seated on a seat 11.

Figure 2:
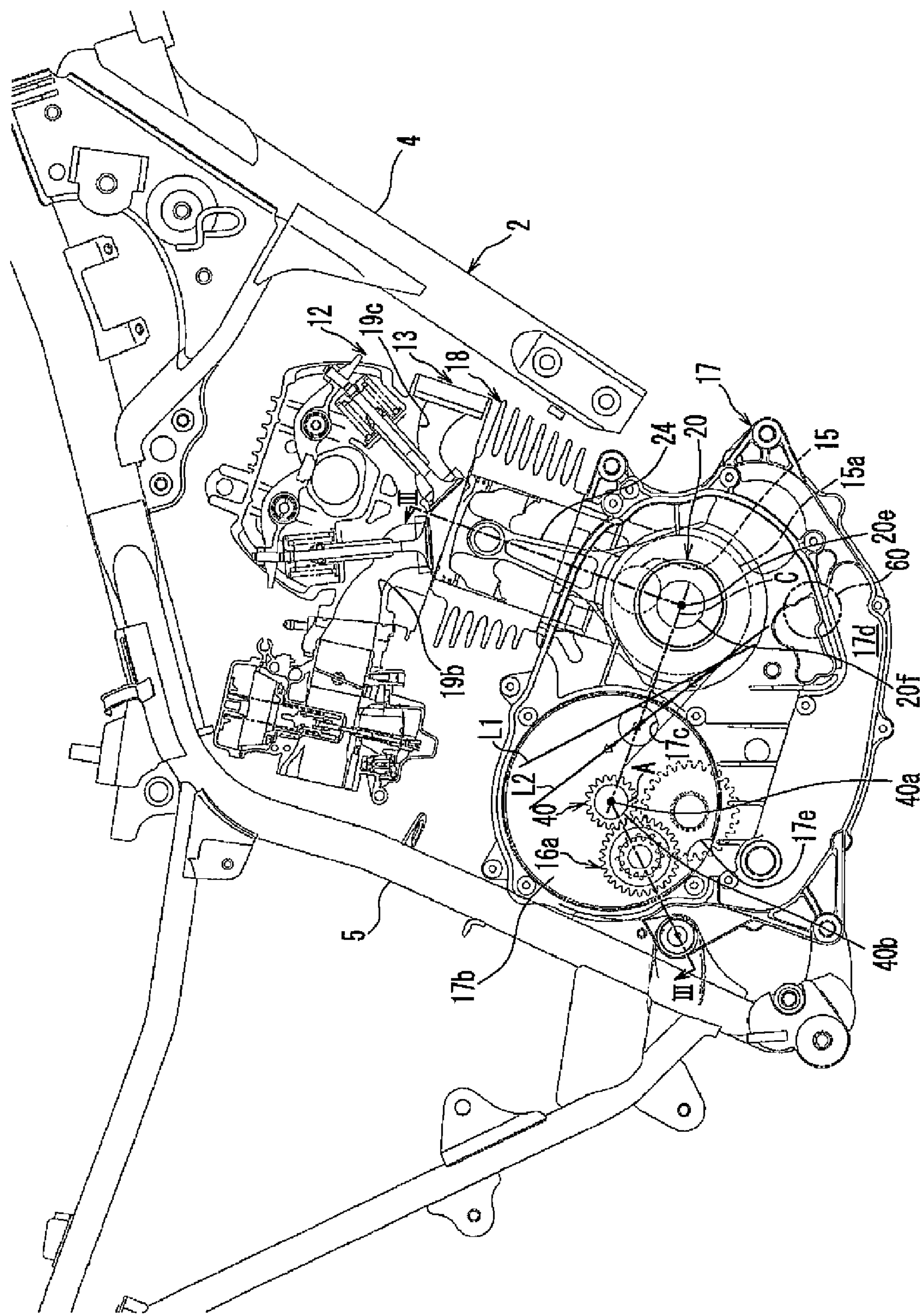
FIG. 2 is a side view of an engine unit embodying the invention.

Motorcycle 1 has a body frame 2 comprising a downtube 4 extending downward from a head pipe 3, and a seat pillar 5 extending rearward from head pipe 3. In this regard, FIG. 2 shows only a part of downtube 4. Head pipe 3 is connected at its lower end to a front wheel 7 through a front fork 6. Body frame 2 journals a rear arm 8 extending rearward. A rear end of rear arm 8 is connected to a rear wheel 9. A cover 10 covers body frame 2. Seat 11 is provided a little rearwardly of a center of cover 10.

Figure 3:
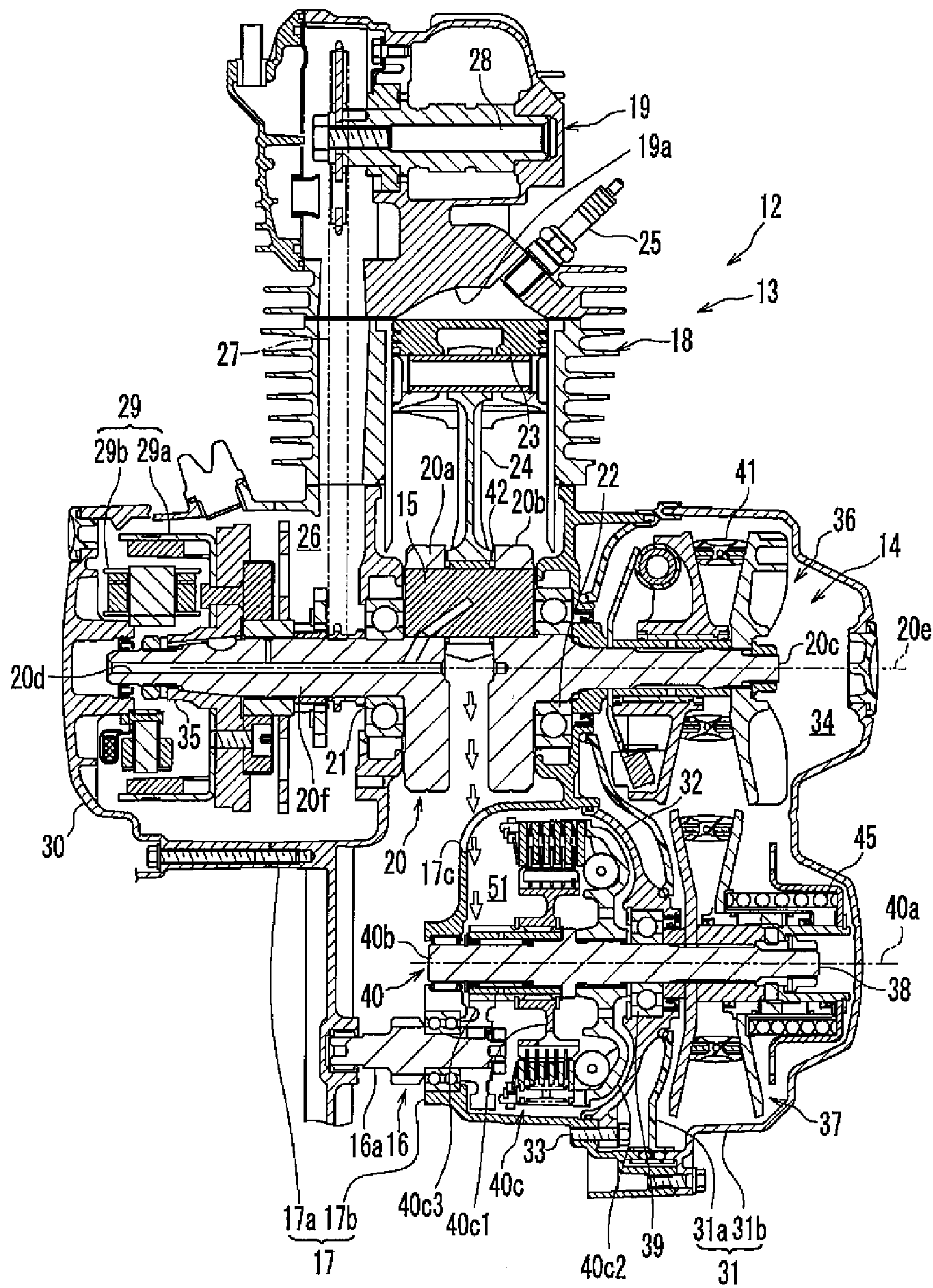
FIG. 3 is a cross sectional view of the engine unit along line III-III of FIG. 2.

An engine unit 12 is supported by and arranged between downtube 4 and seat pillar 5. As shown in FIGS. 2 and 3, engine unit 12 is composed integrally of an engine 13, a belt type continuously variable transmission (CVT) 14, a centrifugal clutch 40*c*, a reduction mechanism 16 and other components. Driving force generated in engine unit 12 is transmitted to rear wheel 9 through power transmission means such as a chain or a belt. While engine 13 is described herein as four-stroke single cylinder engine, it may also be, for example, a two-stroke or a multi-cylinder engine.

—Construction of Engine Unit 12—

The construction of engine unit 12 is described primarily with reference to FIG. 3, which is a cross sectional view along line III-III of FIG. 2. Engine unit 12 comprises engine 13, CVT 14, centrifugal clutch 40*c*, and reduction mechanism 16 as a transmission mechanism. FIG. 3 omits a portion of reduction mechanism 16 for convenience of explanation.

Engine 13 comprises a crank case 17, a cylinder 18 and a cylinder head 19. Crank case 17 includes a first case block 17*a* positioned on the left and a second case block 17*b* positioned on the right. First and second case blocks 17*a* and 17*b* abut in a vehicle width direction. Cylinder 18 is connected forwardly and upwardly obliquely to crank case 17 (see also FIG. 1). Cylinder head 19 is connected to a top end of cylinder 18.

A crank shaft 20 extending horizontally in the vehicle width direction is accommodated in crank case 17. Crank shaft 20 is supported on first case block 17*a* and second case block 17*b* with bearings 21, 22 therebetween. Crank shaft 20 comprises a crank-shaft body 20*f* and a crank pin 15.

A piston 23 is inserted slidably into cylinder 18. One end of a connecting rod 24 is connected to a side of piston 23 toward crank shaft 20. The other end of connecting rod 24 is connected to crank-shaft body 20*f* by a crank pin 15 arranged between a left crank arm 20*a* and a right crank arm 20*b* of crank shaft 20. Thereby, piston 23 reciprocates in cylinder 18 upon rotation of crank shaft 20.

A recess 19*a* communicated to an internal space of cylinder 18, and an intake port 19*b* and an exhaust port 19*c* (see FIG. 2) communicated to recess 19*a*, are formed in cylinder head 19. Also, as shown in FIG. 3, an ignition plug 25 is inserted into and fixed to cylinder head 19 so that an ignition part at a tip end thereof is exposed into recess 19*a*.

A cam chain chamber 26 is formed on the left in cylinder 18 to provide communication between interiors of crank case 17 and cylinder head 19. A timing chain 27 is arranged in cam chain chamber 26 and is wound around crank shaft 20 and a cam shaft 28. Thereby, as crank shaft 20 rotates, cam shaft 28 also rotates, so that an intake valve and an exhaust valve are opened and closed.

A generator case 30, in which a generator 29 is accommodated, is mounted detachably to a left side of a front half of first case block 17*a*. A transmission case 31, in which CVT 14 is accommodated, is mounted to a right side of second case block 17*b*.

A clutch cover 32 is fixed detachably to second case block 17*b* by a bolt 33 on the right side of second case block 17*b* rearwardly of crank shaft 20 in a manner to face second case block 17*b*. Second case block 17*b* and clutch cover 32 constitute a clutch case that compartments and forms a clutch chamber 51 in which a clutch shaft 40 is accommodated. Clutch shaft 40 extends rightward through clutch cover 32 and into transmission case 31. Clutch shaft 40 overlaps a connection 42 of crank shaft 20 and connecting rod 24 in a direction along an axis 20*e* of rotation of crank shaft 20 (see FIGS. 2 and 3). A portion of clutch shaft 40 that extends into transmission case 31 constitutes a secondary sheave shaft 38.

Clutch shaft 40 comprises a clutch shaft body 40*b* and a wet and centrifugal type clutch 40*c*. Centrifugal type clutch 40*c* is mounted to clutch shaft body 40*b* within clutch chamber 51 and meshes with a reduction shaft 16*a* as a transmission shaft of reduction mechanism 16. Centrifugal type clutch 40*c* comprises a clutch boss 40*c*1 arranged in a clutch housing 40*c*2 connected to clutch shaft body 40*b*. Clutch boss 40*c*1 is rotatable relative to clutch shaft body 40*b*. Clutch housing 40*c*2 and clutch boss 40*c*1 separate from each other when clutch shaft body 40*b* is low in speed of rotation. On the other hand, when clutch shaft body 40*b* is high in speed of rotation, clutch housing 40*c*2 and clutch boss 40*c*1 are connected to and rotate together with each other. Clutch boss 40*c*1 is connected to a gear mechanism 40*c*3 that meshes with reduction shaft 16*a*. Therefore, as clutch boss 40*c*1 rotates, gear mechanism 40*c*3 and reduction shaft 16*a* rotate. Thereby, torque of clutch shaft body 40*b* is transmitted to reduction mechanism 16 through centrifugal type clutch 40*c* and is further transmitted to rear wheel 9 by power transmission means such as a chain, a belt, etc.

Reduction shaft 16*a* is more distant from crank shaft 20 than from clutch shaft 40, that is, rearward as shown in FIGS. 2 and 3. In other words, clutch shaft body 40*b*, to which wet centrifugal type clutch 40*c* is mounted, is closer to crank shaft 20 than is reduction shaft 16*a*. No rotating shaft that might prevent oil supply to clutch shaft 40 is present between axis 20*e* of rotation of crank shaft 20 and an axis 40*a* of rotation of clutch shaft 40. In particular, according to the embodiment, no rotating shaft is arranged between axis 20*e* of rotation of crank shaft 20 and axis 40*a* of rotation of clutch shaft 40.

Transmission case 31 is provided on the right of and independently of crank case 17. Transmission case 31 comprises an inner case 31*a* that covers an inner side of CVT 14 in the vehicle width direction, and an outer case 31*b* that covers an outer side of CVT 14 in the vehicle width direction. Inner case 31*a* is mounted to a right side of crank case 17. Outer case 31*b* is mounted to a right side of inner case 31*a*. A belt chamber 34 is compartmented and formed by outer case 31*b* and inner case 31*a*.

A left end of crank shaft 20 extends through first case block 17*a* to reach an interior of generator case 30. Generator 29 is mounted to the left end of crank shaft 20. Generator 29 comprises a rotor 29*b* arranged in opposition to a stator 29*a*. Stator 29*a* is fixed to generator case 30 not to enable rotation and displacement. Rotor 29*b* is fixed non-rotatably to a sleeve 35, which rotates together with crank shaft 20. Thereby, as crank shaft 20 rotates, rotor 29*b* rotates relative to stator 29*a* to generate electric power.

CVT 14 is accommodated in belt chamber 34. CVT 14 comprises a primary sheave 36 and a secondary sheave 37 arranged rearwardly of primary sheave 36. Crank shaft 20 extends through second case block 17*b* and inner case 31*a* into belt chamber 34. A right portion of crank shaft 20 (strictly, a portion on the right of bearing 22) constitutes a primary sheave shaft 20*c*. Primary sheave 36 is journaled by primary sheave shaft 20*c* and thereby rotates as crank shaft 20 rotates.

Secondary sheave shaft 38 is integral with clutch shaft 40 and is arranged on a rear half of transmission case 31. Secondary sheave shaft 38 is mounted to clutch cover 32 with a bearing 39 therebetween. Secondary sheave 37 is journaled by secondary sheave shaft 38 within belt chamber 34.

A belt 41 is wound round secondary sheave 37 and primary sheave 36. Belt 41 may be, for example, a resin block V-belt. When primary sheave 36 rotates together with crank shaft 20, torque thereof is transmitted to secondary sheave 37 through belt 41, and secondary sheave shaft 38 rotates together with secondary sheave 37. Thereby, clutch shaft 40 which is integral with secondary sheave shaft 38 rotates and torque thereof is transmitted to rear wheel 9 through reduction mechanism 16.

—Supply of Lubricating Oil to Clutch Shaft 40—

Supply of lubricating oil to clutch shaft 40 is now described with reference to FIGS. 2 and 3. An oil reservoir portion 17*d* provided on a bottom of crank case 17 stores lubricating oil. Lubricating oil stored in oil reservoir portion 17*d* is supplied to connection 42 of crank shaft 20 and connecting rod 24 by an oil pump 60, which is arranged as a lubricating oil supply means on oil reservoir portion 17*d* in crank case 17. Lubricating oil drawn by oil pump 60 is led to one or a plurality of oil supply passages 20*d*, which are substantially circular in shape as viewed in plan view and opened to a left end surface of crank shaft 20, to be supplied to connection 42.

The lubricating oil as supplied scatters from connection 42 as crank shaft 20 rotates. An oil supply hole 17*c* formed on second case block 17*b* leads lubricating oil scattered as crank shaft 20 rotates into clutch chamber 51 to be supplied to clutch shaft 40. Specifically, as shown in FIG. 2, oil supply hole 17*c* is formed on second case block 17*b* so that a tangent line L1 tangent to both a circular track 15*a* of crank pin 15 and an outer ring of oil supply hole 17*c* is positioned above a lower end A of clutch shaft body 40*b* as viewed in side view. More specifically, tangent line L1 is tangent to a lower portion of circular track 15*a* of crank pin 15 and an upper portion of oil supply hole 17*c* and passes between oil supply hole 17*c* and circular track 15*a* to extend rearward and obliquely upward. Oil supply hole 17*c* is formed on second case block 17*b* so that at least a portion thereof is positioned above a plane C including the axis of rotation of crank shaft 20 and the axis of rotation of clutch shaft 40. For example, a center of oil supply hole 17*c* may be positioned on plane C. Crank shaft 20 and clutch shaft 40 are arranged so that portions thereof face each other with oil supply hole 17*c* therebetween.

Lubricating oil introduced into clutch chamber 51 from oil supply hole 17*c* is supplied to clutch shaft 40 and thereafter returns again to oil reservoir portion 17*d* from an oil discharge hole 17*e* provided downwardly and a little rearwardly of second case block 17*b*.

—Operation and Effect—

As described above, according to the embodiment, as crank shaft 20 rotates, lubricating oil is supplied to clutch shaft 40. Therefore, when crank shaft 20 and clutch shaft 40 are increased in speed of rotation per unit time, lubricating oil supplied to clutch shaft 40 is correspondingly increased in quantity. Accordingly, seizure of centrifugal type clutch 40*c* is surely suppressed even when crank shaft 20 and clutch shaft 40 are high in rotation speed and centrifugal type clutch 40*c* is relatively liable to undergo seizure.

Figure 4:
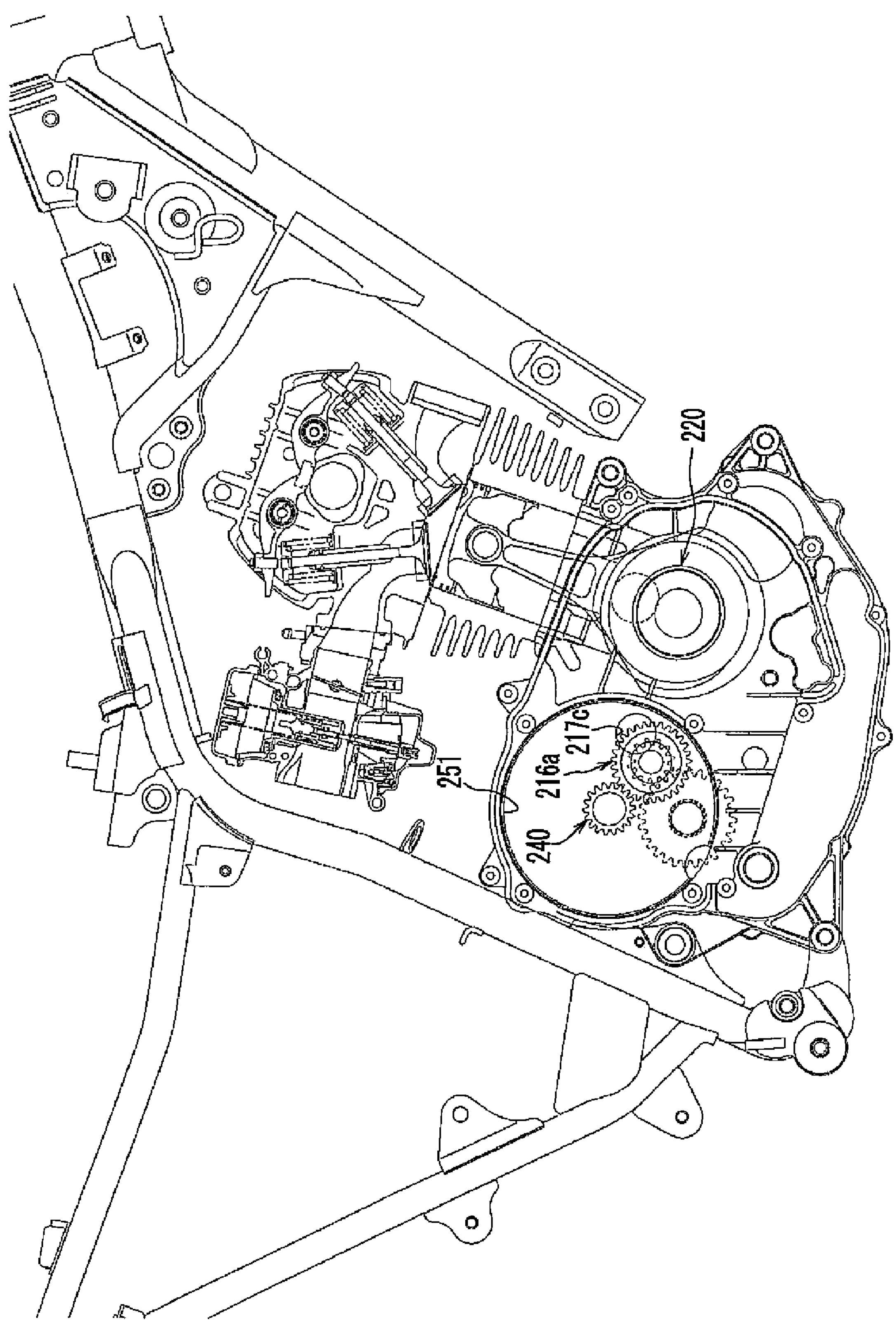
FIG. 4 is a side view of a comparative structure having a transmission shaft arranged closer to a crank shaft than a clutch shaft is.
Figure 5:
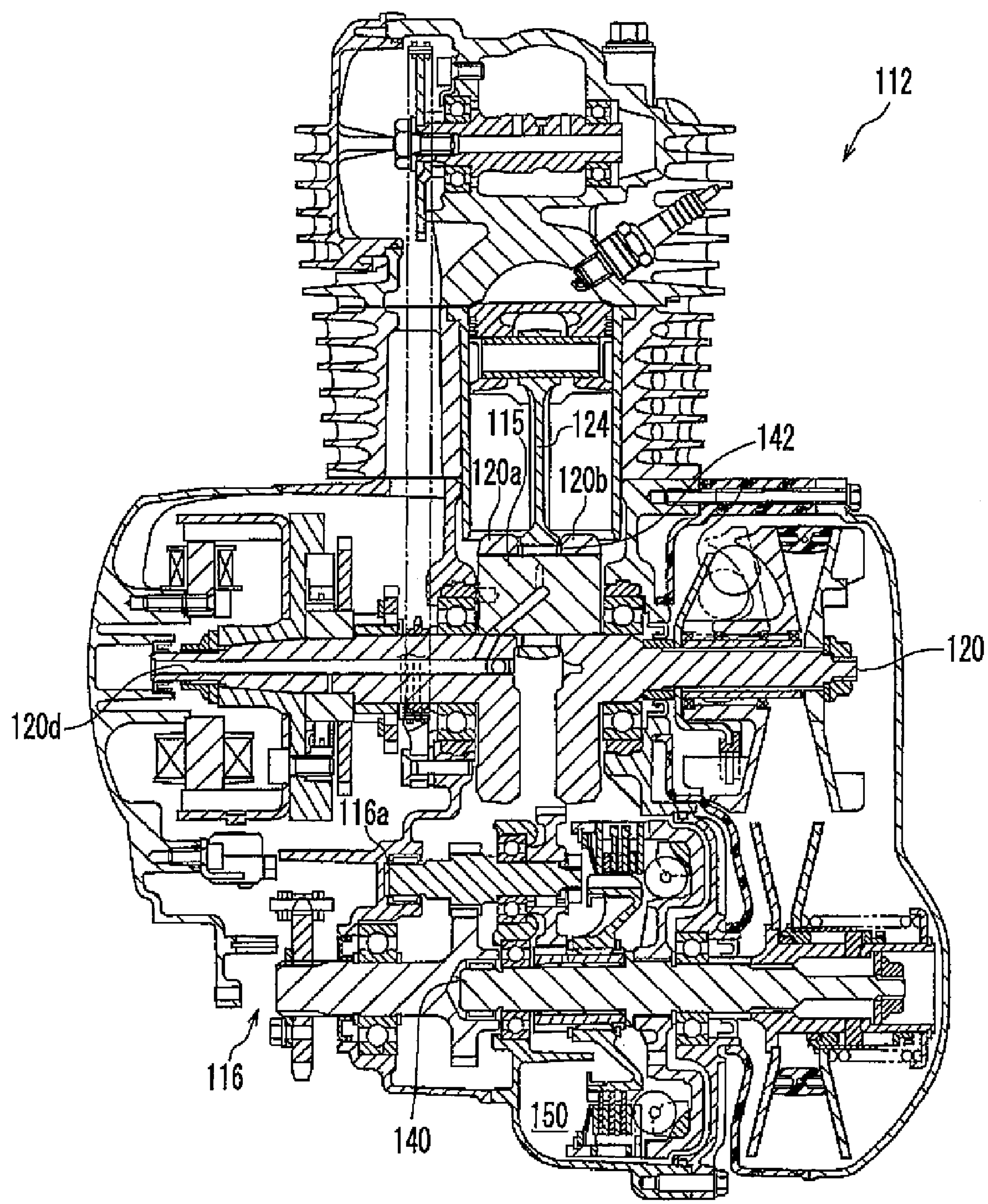
FIG. 5 is a cross sectional view of an engine unit of WO2003/085278.
Figure 6:
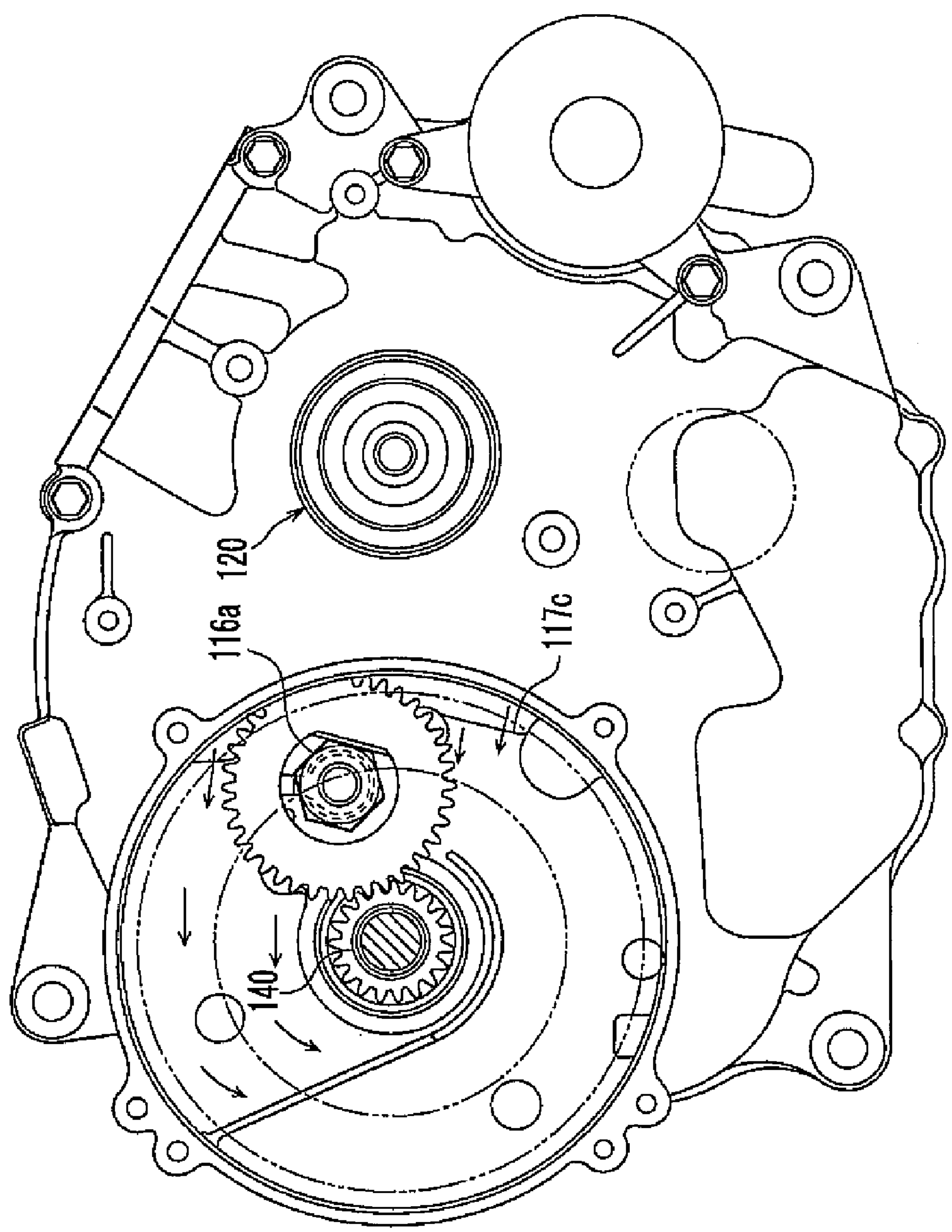
FIG. 6 is a side view of the engine unit of WO2003/085278.

For sake of comparison, with the construction shown in FIG. 4, a reduction shaft 216*a* inhibits lubricating oil introduced into a clutch chamber 251 from being supplied to a clutch shaft 240. Specifically, as shown in FIG. 4, since reduction shaft 216*a* is arranged closer to a crank shaft 220 than to clutch shaft 240, a major part of lubricating oil introduced into clutch chamber 51 from oil supply hole 17*c* strikes reduction shaft 216*a*. With the construction shown in FIG. 4, only a part of the lubricating oil striking reduction shaft 216*a* to scatter is supplied to clutch shaft 240, making it difficult to efficiently supply lubricating oil to clutch shaft 240. Therefore, the quantity of lubricating oil supplied to crank shaft 220 per unit time and the size of oil supply hole 17*c* must be increased.

In contrast, according to the invention, reduction (transmission) shaft 16*a* is arranged rearwardly of clutch shaft 40. That is, clutch shaft body 40*b* is closer to crank shaft 20 than is reduction shaft 16*a*. Accordingly, lubricating oil supplied from connection 42 is efficiently supplied to clutch shaft 40 without obstruction by reduction shaft 16*a*. In particular, there is no rotating shaft between axis 20*e* of rotation of crank shaft 20 and axis 40*a* of rotation of clutch shaft 40, so that lubricating oil is efficiently supplied to clutch shaft 40.

Also, as lubricating oil scatters mainly in a direction in which crank shaft 20 is tangent to circular track 15*a* of crank pin 15, due to rotation of crank shaft 20, oil supply hole 17*c* is arranged so that tangent line L1 tangent to both circular track 15*a* of the crank pin and the outer ring of oil supply hole 17*c* is positioned above lower end A of clutch shaft 40 as viewed in side view. Further, a tangent line L2, which is tangent to circular track 15*a* and passes through a center of oil supply hole 17*c* as viewed in side view, is positioned above lower end A of clutch shaft 40. Therefore, lubricating oil is more efficiently supplied to clutch shaft 40. To further improve efficiency of oil supply, oil supply hole 17*c* is preferably formed so that tangent line L1 (L2) is positioned above axis 40*a* of rotation of clutch shaft 40 and further above an upper end of clutch shaft body 40*b*. In particular, at least a portion of oil supply hole 17*c* is preferably positioned above plane C including axis 20*e* of rotation of crank shaft 20 and axis 40*a* of rotation of clutch shaft 40, and at least portions of crank shaft 20 and clutch shaft 40 face each other.

As described above, according to the embodiment, since lubricating oil is efficiently supplied to clutch shaft 40, seizure of centrifugal type clutch 40*c* is effectively suppressed. Also, oil supply hole 17*c* can be relatively small in size. Further, since a large oil supply capacity per unit time is not so much demanded of oil pump 60, oil pump 60 and hence engine unit 12 can be small in size and weight.

Also, according to the embodiment, as shown in FIG. 2, plane C extends rearwardly upward. That is, crank case 17 is directed rearwardly upward. Secondary sheave shaft 38 is arranged in a relatively high position and therefore is relatively distant from a surface of lubricating oil stored in oil reservoir portion 17*d*. Accordingly, even when motorcycle 1 undergoes vibrations and fluctuation, causing lubricating oil in oil reservoir portion 17*d* to scatter, and the surface of the oil to fluctuate, lubricating oil in oil reservoir portion 17*d* is not supplied in large quantity directly to clutch shaft 40. Consequently, lubricating oil is not excessively supplied to centrifugal type clutch 40*c*. Accordingly, a loss in energy transmission to centrifugal type clutch 40*c* is suppressed. A decrease in rotation speed of centrifugal type clutch 40*c* is also suppressed. The lubricating oil is also inhibited from being increased in temperature and thus from being decreased in lubrication. This construction is especially effective in a straddle-type vehicle that runs on irregular land such as dirt courses, etc., such as offroad type motorcycle 1 according to the embodiment.

<<Modification>>

While engine unit 12 provided with centrifugal type clutch 40*c* has been described as one embodiment of the invention, the clutch may be a type other than centrifugal as far as it is of a wet type.

Engine 13 has been described as arranged such that cylinder 18 extends in a direction relatively close to a vertical direction. However, the invention is not so limited and is applicable to a straddle-type vehicle arranged such that cylinder 18 extends in another direction, such as a direction relatively close to a horizontal direction.

Clutch shaft 40 has been described as overlapping connection 42 in a direction along axis 20*e* of rotation of crank shaft 20 (see FIGS. 2 and 3). Since lubricating oil from connection 42 scatters radially, however, clutch shaft 40 may not necessarily overlap connection 42 in the direction along axis 20*e* of rotation of crank shaft 20. It suffices that at least a portion of clutch shaft 40 be positioned in a region in which lubricating oil from connection 42 scatters.

Oil supply hole 17*c* is not limited in shape and may be, for example, elliptical, rectangular, and polygonal in shape. Also, a plurality of oil supply holes 17*c* may be formed.

According to the embodiment, lubricating oil scattering from connection 42 is led directly into clutch chamber 51 to be supplied to clutch shaft 40. However, a guide member or the like for changing a direction in which lubricating oil scatters may be arranged in the vicinity of oil supply holes 17*c* to cause lubricating oil that strikes the guide member to be supplied to clutch shaft 40.

The invention is useful for a straddle-type vehicle provided with a belt type continuously variable transmission. In particular, the invention is useful for a straddle-type vehicle provided with a belt type continuously variable transmission and having a relatively large displacement.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. An engine unit comprising:

a crank shaft;

a connecting rod connected to the crank shaft;

a lubricating oil supply mechanism arranged to supply lubricating oil to a connection between the crank shaft and the connecting rod;

a clutch shaft including a clutch shaft body arranged substantially parallel to the crank shaft and a wet type clutch mechanism mounted to the clutch shaft body; and a transmission mechanism arranged substantially parallel to the crank shaft and including a transmission shaft arranged to mesh with the clutch mechanism; wherein the clutch shaft body is positioned closer to the crank shaft than is the transmission shaft; and a passage is arranged to supply the lubricating oil from the connection between the crank shaft and the connecting rod directly to the clutch shaft.

2. The engine unit according to claim 1, wherein the lubricating oil supply mechanism includes an oil supply passage arranged inside the crank shaft to supply the lubricating oil to the connection between the crank shaft and the connecting rod.

3. The engine unit according to claim 1, further comprising:

a clutch case defining a clutch chamber arranged to accommodate the clutch shaft and to separate the clutch shaft from the crank shaft; wherein an oil supply hole is provided in the clutch case through which the lubricating oil from the connection between the crank shaft and the connecting rod is led into the clutch chamber.

4. The engine unit according to claim 3, wherein the crank shaft includes a crank shaft body and a crank pin arranged to connect the connecting rod to the crank shaft; and the oil supply hole is arranged so that a tangent line extending from a lower portion of a circular track of the crank pin and an upper portion of the oil supply hole and passing between the oil supply hole and the circular track is positioned above a lower end of the clutch shaft as viewed in a side view of the engine unit.

5. The engine unit according to claim 3, wherein at least a portion of the oil supply hole is positioned above a plane including an axis of rotation of the crank shaft and an axis of rotation of the clutch shaft.

6. The engine unit according to claim 1, wherein the clutch shaft and the connection between the crank shaft and the connecting rod overlap in a direction along an axis of rotation of the crank shaft.

7. The engine unit according to claim 1, wherein the passage from the connection between the crank shaft and the connecting rod to the clutch shaft is unobstructed.

8. The engine unit according to claim 1, further comprising a belt type continuously variable transmission including:

a primary sheave mounted to the crank shaft and arranged to rotate with the crank shaft;

a secondary sheave mounted to the clutch shaft and arranged to rotate with the clutch shaft; and a belt wound around the secondary sheave and the primary sheave.

9. A vehicle comprising the engine unit according to claim 1.

* * * * *